Feb. 2, 1960  J. O. GARRISON ET AL  2,923,554
AIR OPERATED CHUCK
Filed Feb. 3, 1958

INVENTORS
JAMES O. GARRISON
DAVID D. WALKER
BY Tom Walker
ATTORNEY

United States Patent Office 2,923,554
Patented Feb. 2, 1960

2,923,554
AIR OPERATED CHUCK

James O. Garrison and David D. Walker, Dayton, Ohio, assignors to Garrison Machine Works, Inc., Dayton, Ohio, a corporation of Ohio Application February 3, 1958, Serial No. 712,941

10 Claims. (Cl. 279—4)

This invention relates to chucks utilizing a plurality of jaws movable in unison to grip and release a work piece, and more particularly to fluid pressure operated devices of the kind described in which motion of the chuck jaws in at least one direction is effected by fluid pressure under remote control.

The object of the invention is to simplify the construction as well as the means and mode of operation of fluid operated chucks, whereby such chucks may not only be economically manufactured, but will be more efficient and satisfactory in use, adaptable to a wide variety of applications, and be unlikely to get out of order.

A further object of the invention is to introduce a generally new concept into fluid pressure operated chucks, wherein the fluid pressure operated device to achieve movement of the chuck jaws is comprised individually within each jaw.

Another object of the invention is to provide a fluid pressure operated chuck mechanism as described in which the need for moving parts, other than the chuck jaw itself, is obviated and wherein the fluid conducting passageways are comprised in and made an integral part of the chuck structure.

A further object of the invention is to utilize a tubular bushing as a mount for the chuck jaw and as a means to conduct fluid for the operation of the jaw, and in conjunction therewith to provide simple and effective means for sealing against the loss of pressure fluid from the system.

A further object of the invention is to provide a fluid operated chuck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in longitudinal section of a chuck in accordance with the illustrated embodiment of the invention, only one chuck jaw being shown and a work piece to be gripped being indicated in dot-dash outline;

Like parts are indicated by similar characters of reference throughout the several views.

Figure 1:
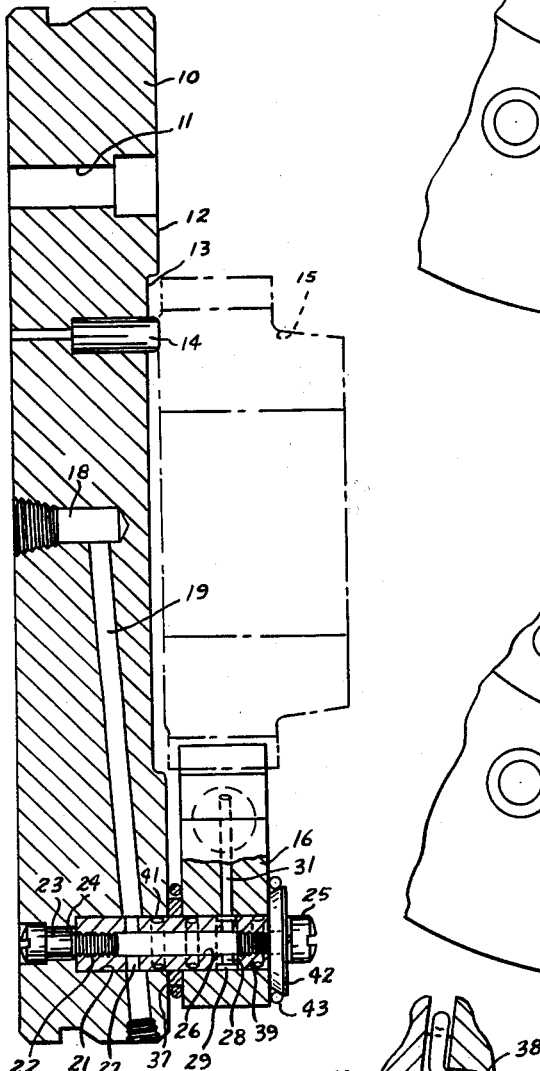

Referring to the drawing, the invention is disclosed as embodied in a gear chuck comprising a body 10 having a circular series of longitudinal through openings 11 by which the chuck body can be bolted or otherwise secured to a stationary support. On what may be considered to be the upper or outer side of the body 10 is a planar surface 12 in the approximate center of which is a recess 13. Projecting into the recess 13, from the bottom thereof, is a circular series of pins 14 constituting rests or supports for a gear blank 15. In surrounding relation to the recess 13, and supported on the body 10 in a manner later to be considered, is a circular series of chuck jaws 16 (one shown) movable in an oscillatory manner in a plane parallel to the surface 12 to grip and to release the blank 15. As indicated, the work engaging portions of the chuck jaws 16 are formed with teeth 17 adapted to engage teeth on the gear blank for a secure holding thereof to permit precision grinding, facing and like operations to be performed thereon.

The instant invention is more particularly concerned with the construction, mounting and mode of operation of the chuck jaws, and since all of these are the same for each of the jaws, only one is disclosed herein. Opening into the body 10, from the under side thereof, is a bore 18 which is an air inlet common to the several chuck jaws, the bore being adapted to be permanently connected to a pressure fluid conducting pipe line or the like which incorporates at a realtively remote point a valve or other means by which the fluid under pressure may selectively be communicated to the inlet 18.

Extending from the inlet 18 to each chuck jaw is a supply passage 19 which is in intersecting relation to a bore 21 opening through the surface 12. Installed in the bore 21 is one end of a tubular bushing 22, the other end of which projects through and beyond the surface 12. The installed or inner end of the bushing 22 is anchored in the body 10 by a screw 23 having access to the bore 21 from the under side of the body by way of an opening 24. The screw 23 has a threaded engagement in the adjacent open end of the bushing 22 and serves both as an anchor for the bushing and as a means to close one end of the interior of the bushing. The other end thereof is closed by the threaded shank of a similar screw 25 axially installed in the opposite projecting end of the bushing. The interior of the bushing 22 accordingly may be considered to define a pressure fluid passage or chamber 26 which is closed at its opposite ends. A set of radial ports 27 in the bushing 22 communicate the passage or chamber 26 with the supply duct 19 in the body. Another set of radial ports 28 in the bushing 22 communicate the interior passage 26 with an annular groove 29 therein. The latter in turn communicates with one end of a fluid passage 31 in a chuck jaw 16, which jaw is mounted on the projecting end of the bushing 22 for relative swinging motion, the bushing serving as a pivot stud for the chuck jaw.

The passage 31 extends forwardly in the chuck jaw and communicates with the inner end of a piston chamber 32 opening through one side edge of the jaw. Slidably mounted in the chamber 32 is a piston 33 on the inner end of which is a reversely disposed cup seal 34. The construction and arrangement of parts, it will be understood, is such that the admission of fluid under pressure to the chamber 32 tends to effect a relative extending motion of the piston 33 out of the chamber 32 and relatively to the jaw 16. The outer end of the piston 33 abuts an upstanding stud 35 formed integrally with or otherwise installed as a unitary part of the body 10 in the surface 12 thereof. The stud 35 serves as a reactant member in response to the energizing of the chamber interior 32 with pressure fluid, whereby the motion tending to extend the piston 33 is resolved instead, into a leftward (Fig. 2) movement of the chuck jaw itself while the piston 33 remains stationarily engaged with the reactant member stud 35. Being mounted upon the bushing 22 for swinging motion, the described movement of the jaw 16 is in a counterclockwise direction about the bushing. As indicated, the mounting of the chuck jaw upon the bushing 22 is an eccentric arrangement whereby a clockwise swinging movement of the jaw is effective to move the toothed portion 17 thereof not only in a lateral sense but also in a radial relative approaching sense with respect to the periphery of work piece 15 whereby the cooperative action of the several chuck jaws engaging different portions of the periphery of the work piece may result in the piece being firmly clamped and held by the jaws.

Figure 2:
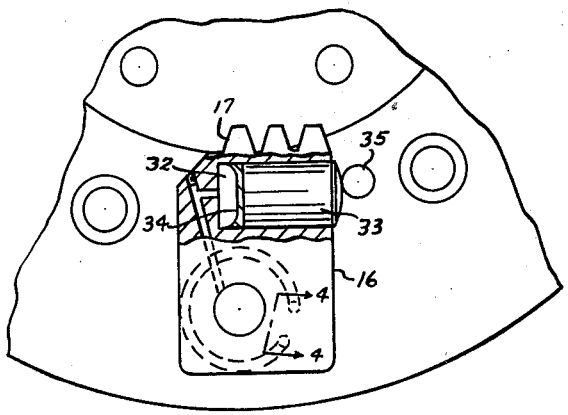
Fig. 2 is a fragmentary view in front elevation of the chuck of Fig. 1, a part of the chuck jaw being broken away to show the fluid pressure operated device therein and the pivot stud and associated parts upon which the chuck jaw is mounted being omitted.
Figure 3:
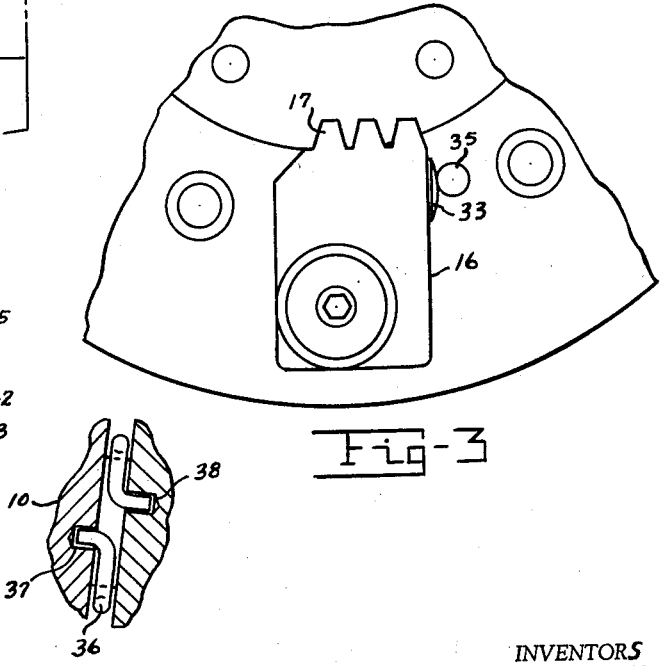
Fig. 3 is a view like Fig. 2, but completely in elevation and with all parts included.
Figure 4:
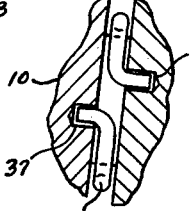
Fig. 4 is a detail view of a spring device cooperating with the fluid pressure device to effect and control the movements of the chuck jaw, being a sectional view taken substantially along the line 4—4 of Fig. 2.

Motion of the chuck jaw in an opposite or clockwise direction of movement, as indicated in Fig. 2, is effected by a torsion spring 36 which surrounds a spacer element 37 located between the chuck jaw and the surface 12 of the body. The spring 36 is in effect a split ring, with one end thereof anchored, as shown in Fig. 4, in a recess 37 in the body 10 and with the other end thereof similarly anchored in a recess 38 in the jaw 16. Motion of the chuck jaw under the influence of applied pressure fluid serves to wind or to tension the spring 36 so that motion of the chuck jaw in a direction to grip the work is accomplished against the urging of the spring 36 and in effect loads or tensions the spring. Upon release of the applied air pressure, the chuck jaw is restored to control of the spring 36 which returns it in a clockwise direction as viewed in Fig. 2 to a position of release with respect to the work piece. The chuck jaw thus is movable between work gripping and work releasing positions; in the one instance by fluid pressure and in the other instance by spring means tensioned by movement of the jaw in the first instance.

The passage 31 in the jaw 16 opens into a through opening 39 in the jaw 16, through which opening extends the bushing 22. The passage registers with the annular groove 29 in the bushing. To inhibit an escape of pressure fluid from the opposite ends of the opening 39, as well as from the recess 21 in the body 10, there may be recessed in the periphery of the bushing, at selected longitudinal points, resilient O-ring seals 41. Also, the aforementioned screw 25 is a part of a cap assembly further including a cap 42 having a frusto-conical peripheral edge with another resilient O-ring seal 43 being installed between such periphery and the surface 16. The result is substantially to preclude the escape of pressure fluid from the opening 39 outward over the upper surface of the jaw 16. The cap screw 25 serves to hold the cap 42 in an assembled position upon the jaw 16 and is adjusted to apply a predetermined amount of squeeze or compression to the seal 43 upon the surface 12.

It will be understood that the chamber 32 of each jaw 16 is continuously open to the air inlet 18 and that upon the admission of fluid under pressure to the inlet 18 pressure is applied at substantially the same moment to all of the chambers 32 with the result that all of the jaws 16 move simultaneously to grip the work. Each jaw, however, carries its own fluid pressure device and is in effect individually operated to grip and to release the work. In the latter connection, upon the release of pressure from inlet 18, the flow of pressure fluid to and from this chamber being under the control of suitable valve means such as a four-way valve connecting the chamber alternately to a source of pressure fluid and to exhaust, the pressure in each of the chambers 32 is released and the several jaws are free to return to released position under the urging of their respective springs 36.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck, including a body, at least one work engaging jaw member on said body movable between work gripping and releasing positions, a relatively stationary reactant means on said body, a piston chamber in said jaw member, means to supply pressure fluid to said chamber, a piston received in said chamber and engaging said reactant means, the supply of pressure fluid to said chamber resulting in a movement of said jaw member relatively to said piston to one of said positions, means to move said jaw member to the other one of said positions, and other work engaging means on said body cooperating with said jaw in the work gripping position thereof.

2. A chuck according to claim 1, characterized in that said means to move said jaw member comprises yielding means tensioned by movement of said jaw to said one position and effective upon release of fluid pressure in said chamber to return said jaw to the other said position.

3. A chuck, including a body, at least one work engaging jaw on said body movable between work engaging and releasing positions, a relatively stationary reactant means on said body, a piston chamber in said jaw, a piston having one end received in said chamber and the other end extending therefrom toward contact with said reactant means, yielding means urging said jaw in a direction to engage said piston with said reactant means, means including a pressure fluid passage leading through said jaw to said chamber to supply fluid under pressure to said chamber to move said jaw against the urging of said yielding means and relatively to said piston, and other work engaging means on said body cooperating with said jaw in the work engaging position thereof.

4. A chuck, including a body, a pivot stud projecting from said body, work holding means including a chuck jaw rotatable on said pivot stud, a piston chamber in said jaw, a piston having one end received in said chamber, relatively stationary reactant means on said body engageable by the other end of said piston, and a pressure fluid passageway extending from said body through said pivot stud and through said jaw to supply fluid under pressure to said piston chamber to effect a relative separating motion of said jaw and piston.

5. A chuck, including a body, a pressure fluid conducting passage in said body, a pivot stud installed in said body to intersect said passage, said stud having a longitudinally extending passage communicating with the passage in said body, work holding means including a chuck jaw pivotally mounted on said stud, a piston chamber in said chuck jaw, a piston in said chamber, reactant means on said body engageable by said piston, and a pressure fluid conducting passage in said jaw communicating said piston chamber with the longitudinally extending passage in said pivot stud.

6. A chuck, including a body having a pressure fluid conducting passage, a tubular bushing having one end received in said body in intersecting relation to said passage and having its other end projecting from said body, work holding means including a chuck jaw pivotally mounted on the projecting end of said bushing, lateral openings in said bushings to communicate the interior thereof with the said fluid passage in said body, means to close the projecting end of said bushing against the escape of pressure fluid there from, a fluid conducting passage in said jaw, openings in said bushing to communicate the interior thereof with said last named passage, and a fluid pressure operated device carried by said jaw and reacting against said body to move said jaw in response to the supply of pressure fluid to said device by said last named passage.

7. A chuck including a body having a pressure fluid supply passage therein, a recess in said body intersecting said supply passage, a tubular bushing having one end received in said recess and the other end projecting therefrom, the interior of said bushing communicating with said supply passage, work holding means including a chuck jaw having a through opening through which the projecting end of said bushing extends, said jaw being thereby pivotally mounted on said bushing, a cap assembly seated on said chuck jaw in concentric relation to said bushing and including sealing means to inhibit escape of pressure fluid outwardly of the opening in said jaw, said assembly further including screw means received in the projecting end of said bushing, a pressure fluid operated device carried by said chuck jaw and reacting against said body to rock said jaw about said bushing in response to a supply of pressure fluid thereto, and a fluid conducting passage from the interior of said bushing through said jaw to said device therein.

8. A chuck, according to claim 7, characterized by spring means urging said jaw in one direction, said pressure fluid operated device being arranged to move said jaw in the opposite direction.

9. A chuck including a body, at least one work engaging jaw member mounted on said body for rocking motion between work gripping and releasing positions, fluid pressure operated means to move said jaw to one of said positions and to control its movement to the other position, said means including a piston interposed between said body and said jaw and ducts to introduce pressure fluid between said piston and said jaw, the introduction of such pressure effecting a relative separating motion of said jaw from said piston toward said one position, and yielding means tensioned by movement of said jaw to said one position to return it to said other position upon release of applied fluid pressure between said jaw and said piston, and other work engaging means on said body cooperating with said jaw in the work gripping position thereof.

10. A chuck, including a body, a plurality of work engaging jaw members on said body movable between work gripping and releasing positions, relatively stationary reactant means on said body individual to each of said jaw members, a piston chamber in each of said jaw members, a piston received in said chamber and engaging a respective reactant means, a supply of pressure fluid to said chamber resulting in a movement of said jaw member relatively to said piston to one of said positions, means to move said jaw members to the other one of said positions, and means to supply pressure fluid simultaneously to the chambers of all of said jaw members and simultaneously to discontinue such supply.

References Cited in the file of this patent

UNITED STATES PATENTS

| | | |
|---|---|---|
| 1,815,562 | Godfriaux | July 21, 1931 |
| 2,323,091 | Johnston et al. | June 29, 1943 |
| 2,587,893 | Pridy et al. | Mar. 4, 1952 |
| 2,667,356 | Forward | Jan. 26, 1954 |
| 2,747,882 | Garrison et al. | May 29, 1956 |
| 2,785,904 | Garrison et al. | Mar. 19, 1957 |